Figure 1:
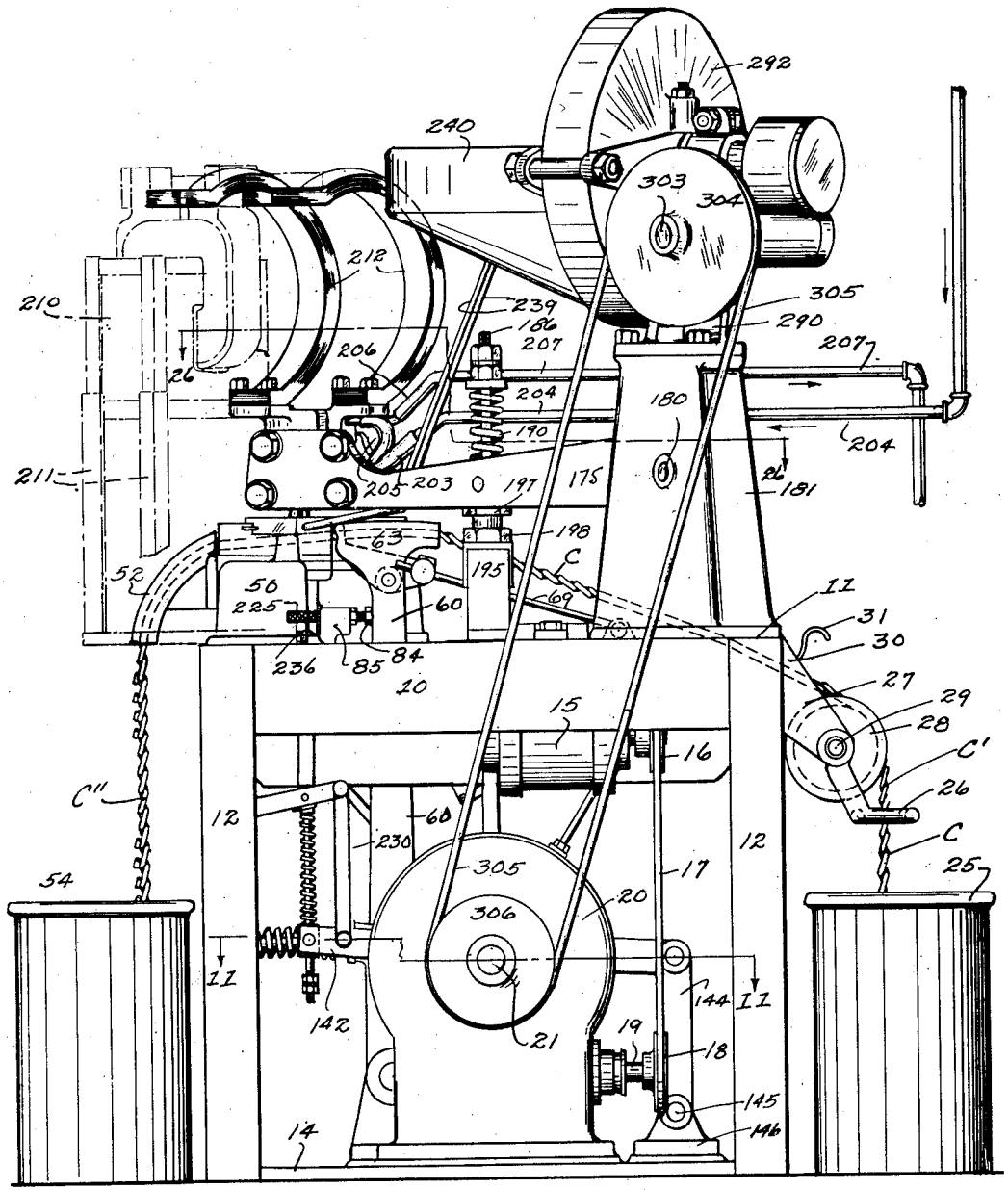

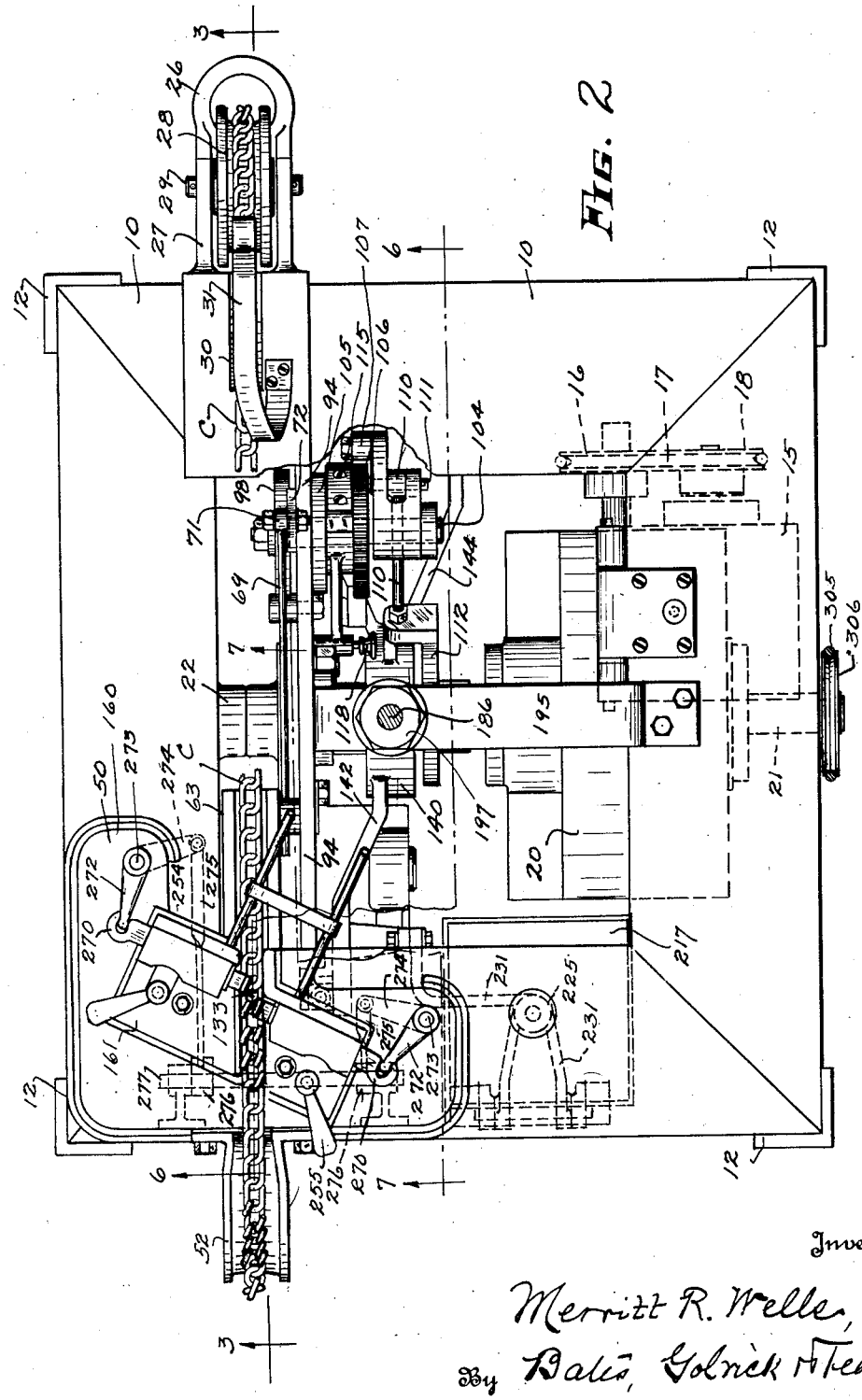

March 14, 1933.  M. R. WELLS  1,901,211
ELECTRIC WELDING MACHINE
Filed Dec. 15, 1930   11 Sheets-Sheet 3
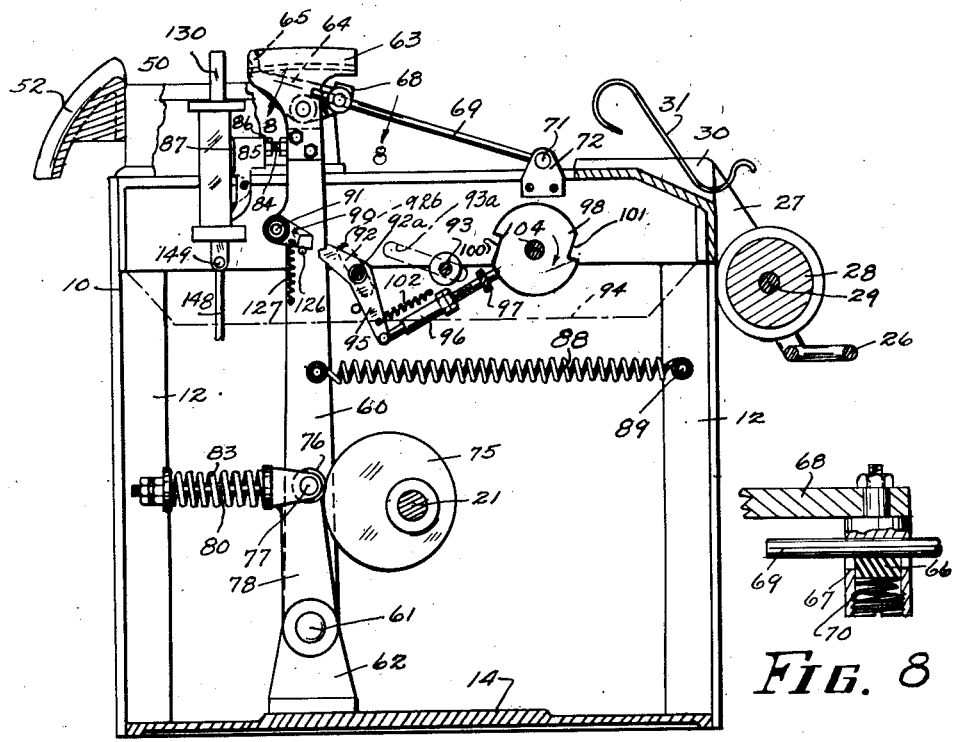
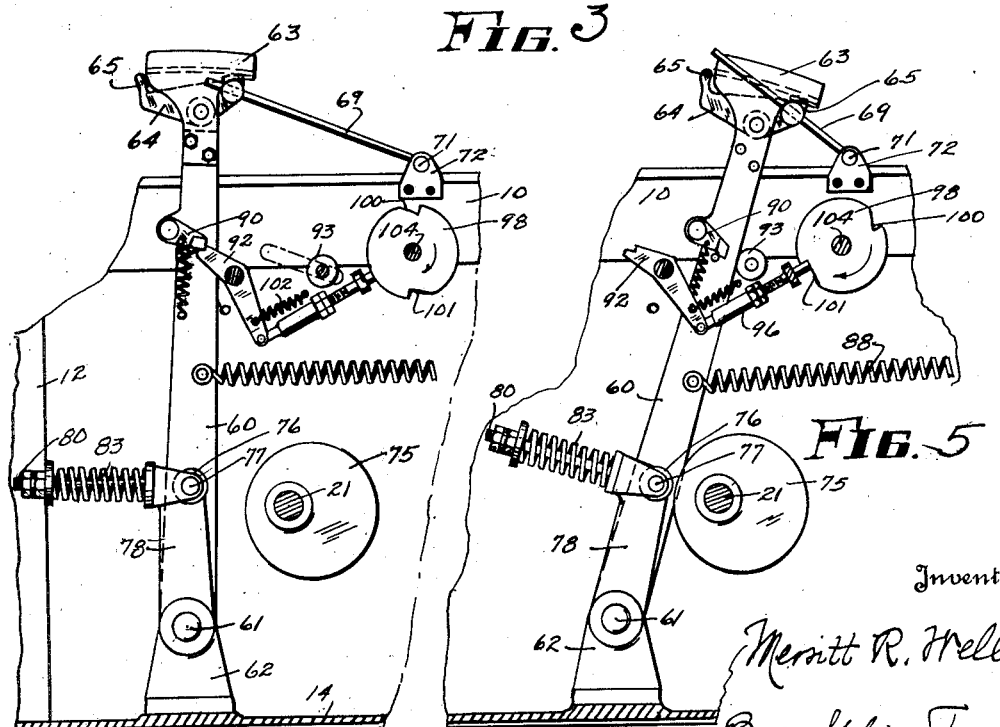

March 14, 1933.  M. R. WELLS  1,901,211

ELECTRIC WELDING MACHINE

Filed Dec. 15, 1930  11 Sheets-Sheet 5

Inventor

Merritt R. Wells,
By Bates, Golrick & Teare
Attorneys

March 14, 1933.   M. R. WELLS   1,901,211
ELECTRIC WELDING MACHINE
Filed Dec. 15, 1930   11 Sheets-Sheet 6
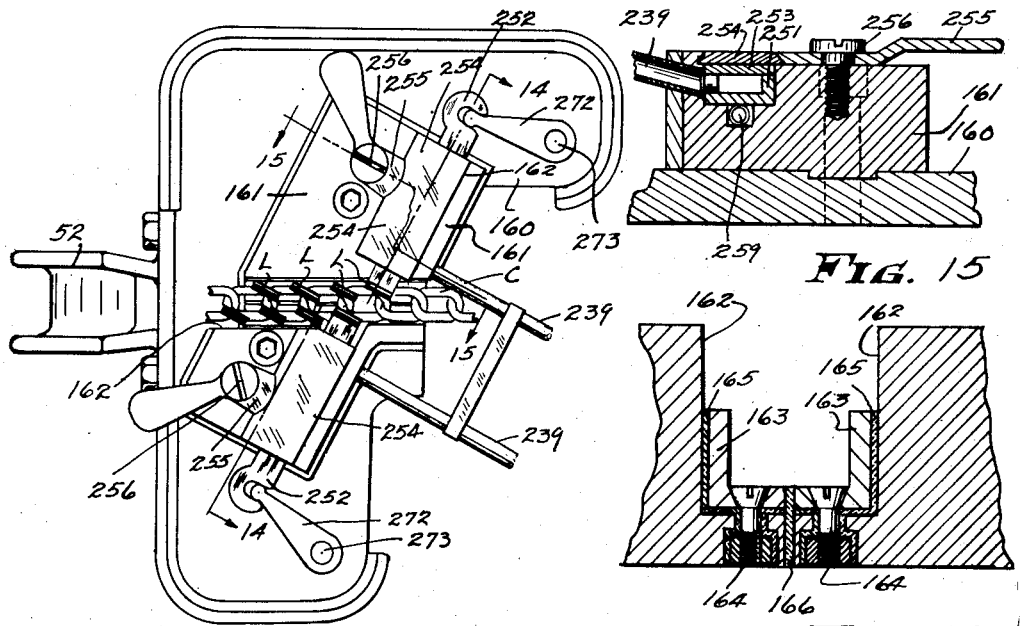
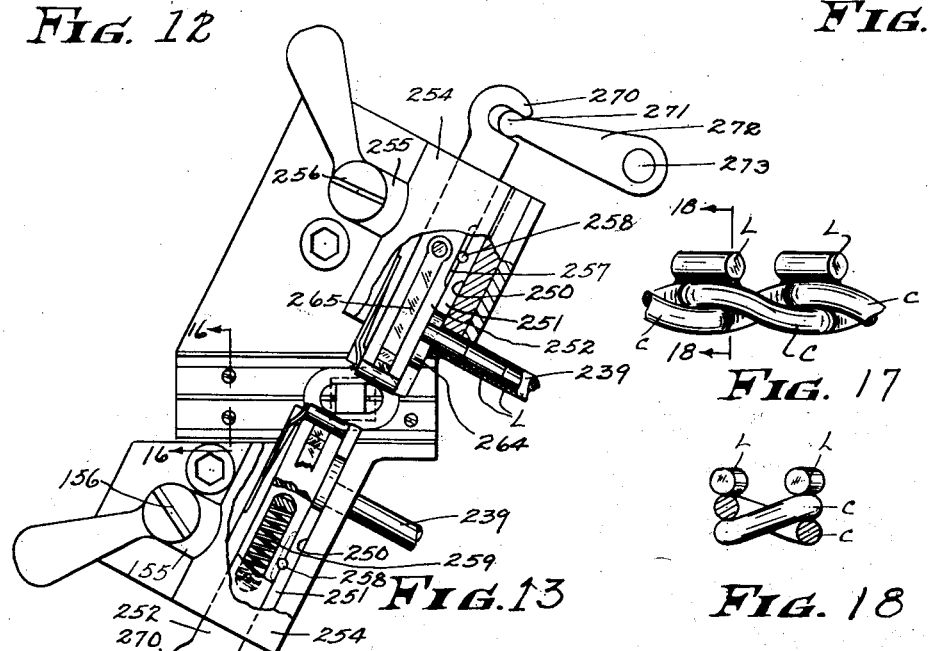
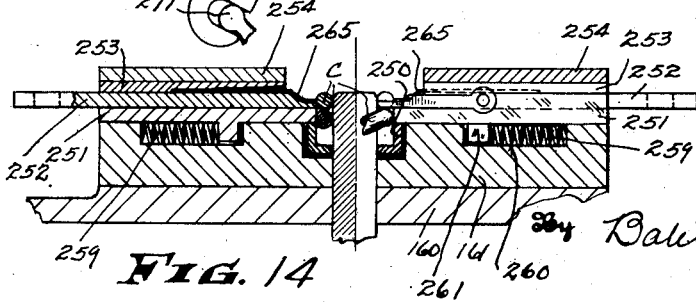
Inventor
Merritt R. Wells,
By Bates, Goldrick & Teare,
Attorneys

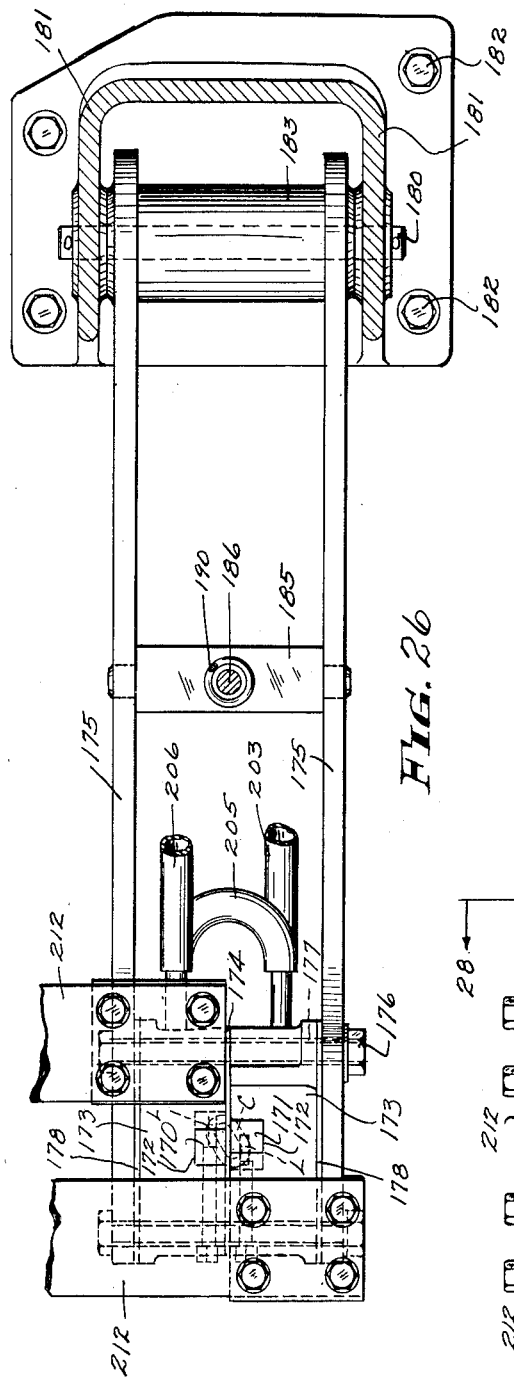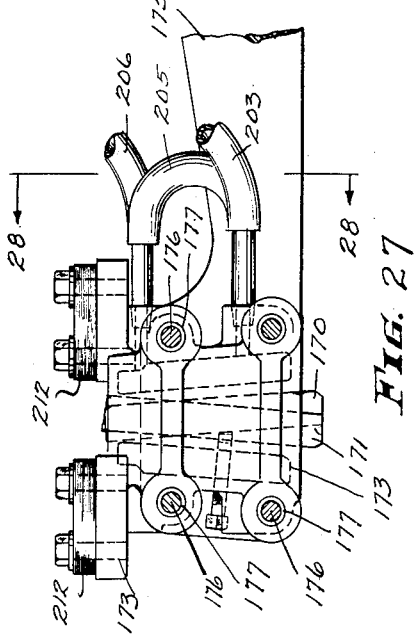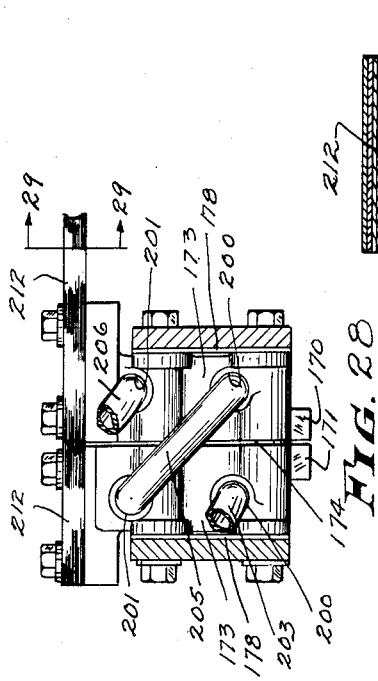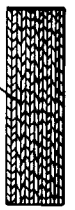

March 14, 1933. M. R. WELLS 1,901,211
ELECTRIC WELDING MACHINE
Filed Dec. 15, 1930 11 Sheets-Sheet 9
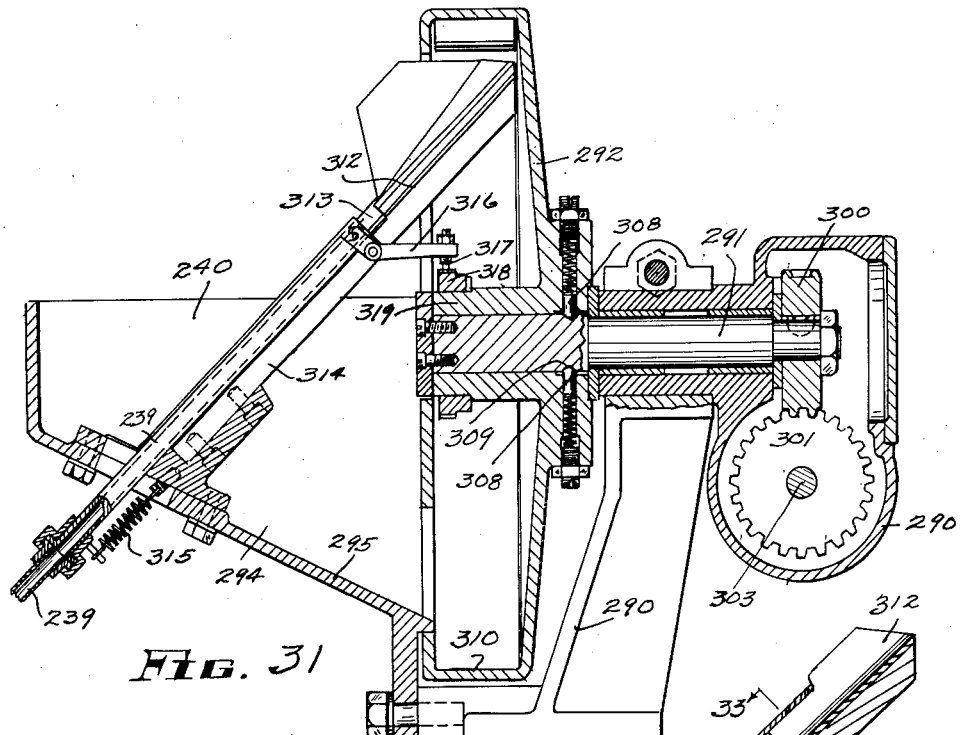
FIG. 31
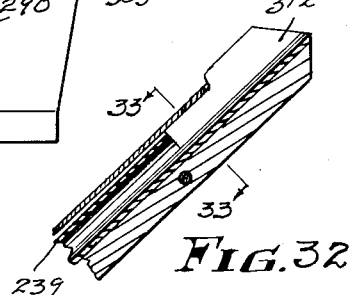
FIG. 32
FIG. 33
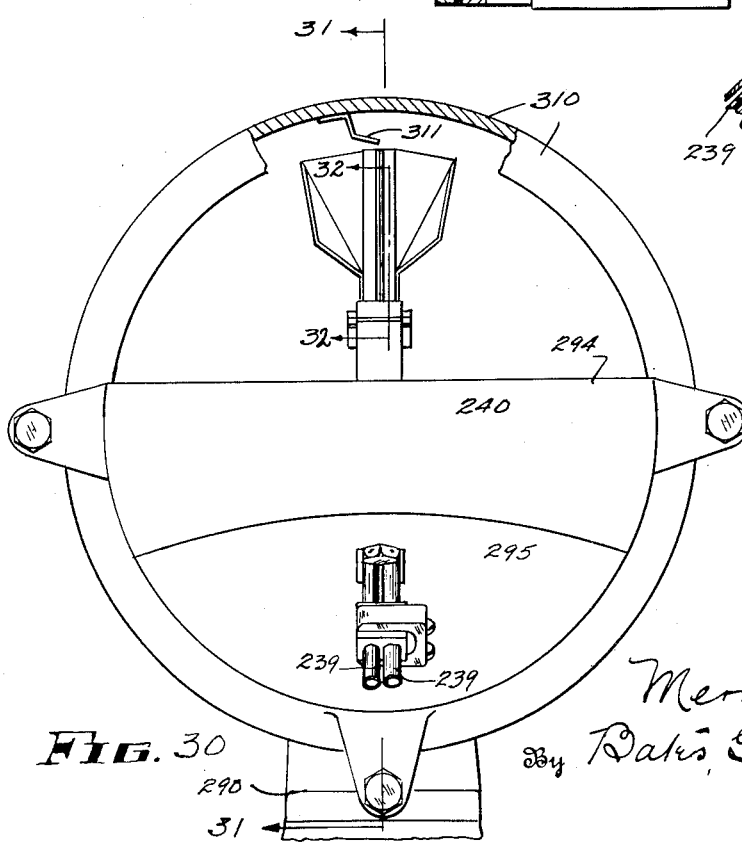
FIG. 30
Inventor
Merritt R. Wells
By Bates, Golrick & Teare
Attorneys March 14, 1933. M. R. WELLS 1,901,211
ELECTRIC WELDING MACHINE
Filed Dec. 15, 1930 11 Sheets-Sheet 10
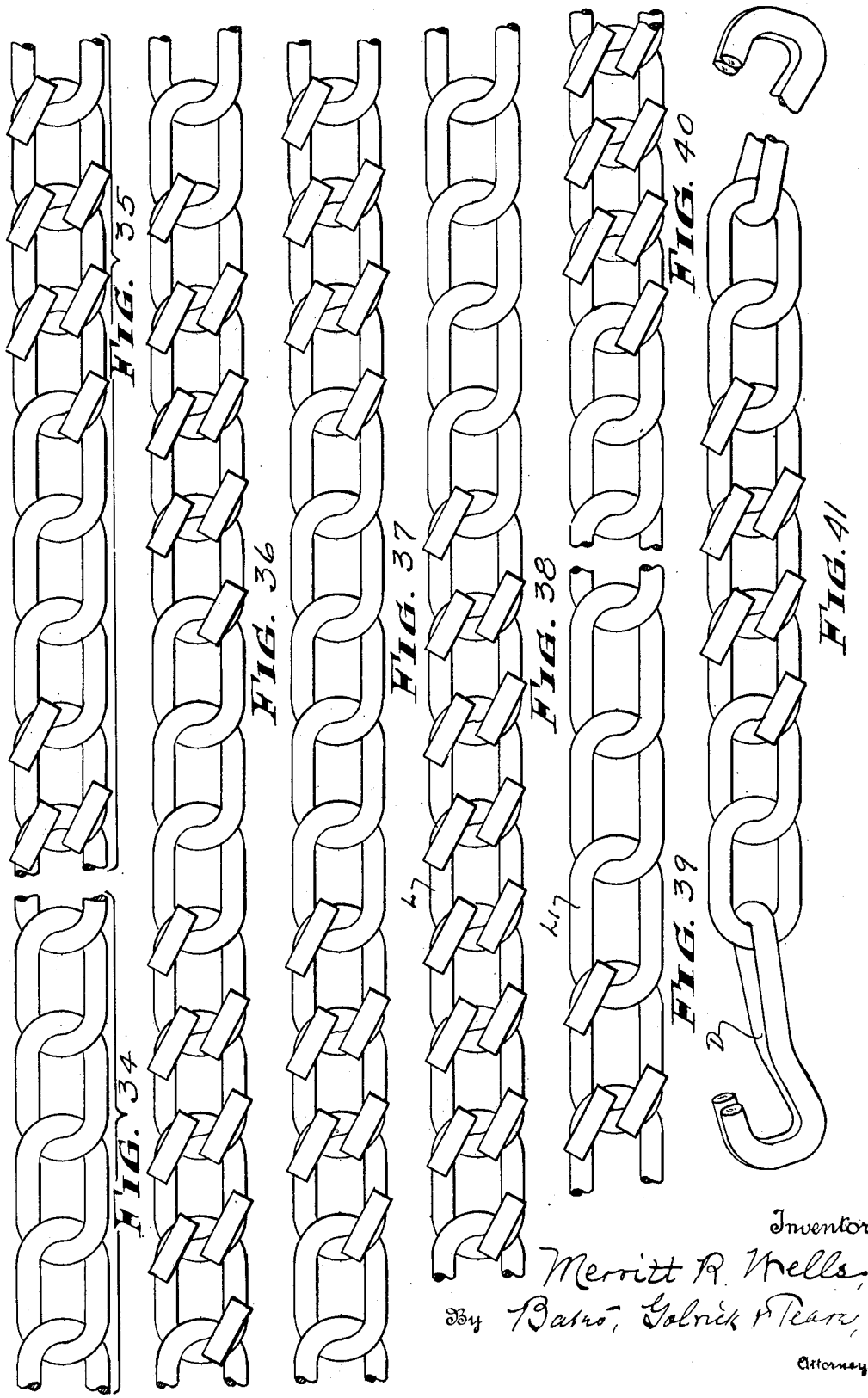

March 14, 1933.  M. R. WELLS  1,901,211
ELECTRIC WELDING MACHINE
Filed Dec. 15, 1930   11 Sheets-Sheet 11

Patented Mar. 14, 1933

1,901,211

UNITED STATES PATENT OFFICE

MERRITT R. WELLS, OF CLEVELAND HEIGHTS, OHIO, ASSIGNOR, BY MESNE ASSIGNMENTS, TO THE McKAY COMPANY, OF PITTSBURGH, PENNSYLVANIA, A CORPORATION OF PENNSYLVANIA

ELECTRIC WELDING MACHINE

Application filed December 15, 1930. Serial No. 502,362.

This invention relates to an apparatus for electrically welding metal parts together, and particularly by a weld of the resistance type. The invention is more especially concerned with the welding of lugs to links of a chain.

One of the objects of the invention is to provide for making short chain sections having links provided with projected lugs and having attaching devices at the ends of the sections, so that the section may be effectively used as the cross member of a tire chain, and I accomplish this result by making a substantially continuous chain, some of the links of which have lugs, and thereafter severing portions of such chain and securing fastening devices to the extreme links of the severed portion.

Anti-skid tire chains for automobiles have long been in use, and have been provided with groups of cross links, the ends of which are usually hooked to a pair of circumferential chains. Various kinds and types of cross-links have been used, and it has been found that a very successful type is one having a plurality of chain links, to some of which are secured small lugs, which lugs are adapted to coact with the road surface, thereby providing additional traction to the wheels and preventing unnecessary skidding.

Heretofore, the welding of lugs to links has been accomplished by hand. The operator has manually placed and held a lug in position on a link, and then manually welded the same in place with a suitable welding tool, and then placed another lug in position, and welded it on the opposite side of the link, and so on, until sufficient lugs have been welded to the chain. This method has been slow, tedious and costly, and has, to a great extent, prevented the use of tire chains of this type.

This invention provides an apparatus for automatically placing the lugs on the chain, and welding them thereon without the use of manual labor or manually performed operations, thereby greatly decreasing the cost of manufacture of the chain, insuring a far better weld between the lug and the links, and saving to a great extent the time taken to manufacture such a chain, thereby placing this chain within the reach of all prospective purchasers.

Another object is to enable the production of groups of lugged links alternated with groups of plain links in a continuous chain which is thereafter severed through certain plain links to produce the individual sections. When operating on a continuous chain, my apparatus applies lugs to a group of connected links and then leaves a group of connected links plain and so on alternately, and thereafter by severing the chain through plain links and the attachment of fastening devices to the end links of the section which are plain, enables the production of the desired form of cross chain.

A further object of the invention is to provide a very effective welding operation arranged to act simultaneously on a pair of lugs to weld them to opposite portions of a link, thus giving a rapid operation, and producing a uniform product.

My invention includes the apparatus I have devised for assisting in performing the general operation above outlined. A characteristic of that apparatus, which is included in my invention, is mechanism for feeding a predetermined number of links successively to the welded unit, and welding the lugs thereon, and then feeding at one operation a predetermined number of links which are to be without welded lugs, whereby I produce the alternate lugged and unlugged groups of links in a continuous chain.

More specifically, it may be stated to be an object of this invention to provide an apparatus which operates successively to weld lugs to a group of links in the chain being fed and thereafter to feed a group of links without the attachment of lugs, the feeding of such unlugged group being in a cycle of the entire mechanism corresponding to the feeding of one link having lugs, so that a chain with alternate groups of lugged and unlugged links may be produced quickly and economically. This method and apparatus provides for varying the number of lugged and unlugged links as desired, there being preferably an odd number of unlugged links in the group; then in making a cross chain section from such continuous chain I sever the continuous chain through the middle unlugged link of a group and apply attaching devices to the terminal unlugged links of the severed section.

The embodiment of my apparatus illustrated in the drawings hereof comprises means for feeding a continuous length of chain to a suitable welding mechanism, to which individual lugs are fed, preferably a pair at a time, and placed in position on top of a link of the chain, and means for simultaneously welding the pair of lugs to the diagonally opposite corners of the link, the chain being then advanced a distance of one link and the operation repeated until the desired number of lugged links has been provided; then feeding at one operation a plurality of links of the number desired for the unlugged links of the chain, without applying lugs or operating the welding mechanism. Thereafter, I sever the chain in the regions of the unlugged portions into small sections, which constitute the main portion of the cross-chain members of the tire chain, these cross-chains thus comprising a central portion having links to which lugs have been welded, and end portions which have no lugs. Hook links are then secured to the ends of such cross chains and the chains are put in place on the standard circumferential bands, which constitute the retaining means which keep the chain in place on the tire.

My invention includes the different aspects of the apparatus above briefly outlined, and also the more specific embodiments illustrated in the drawings hereof, and hereinafter more fully described, the essential novel features of the apparatus being set out in the claims hereof.

Figure 6:
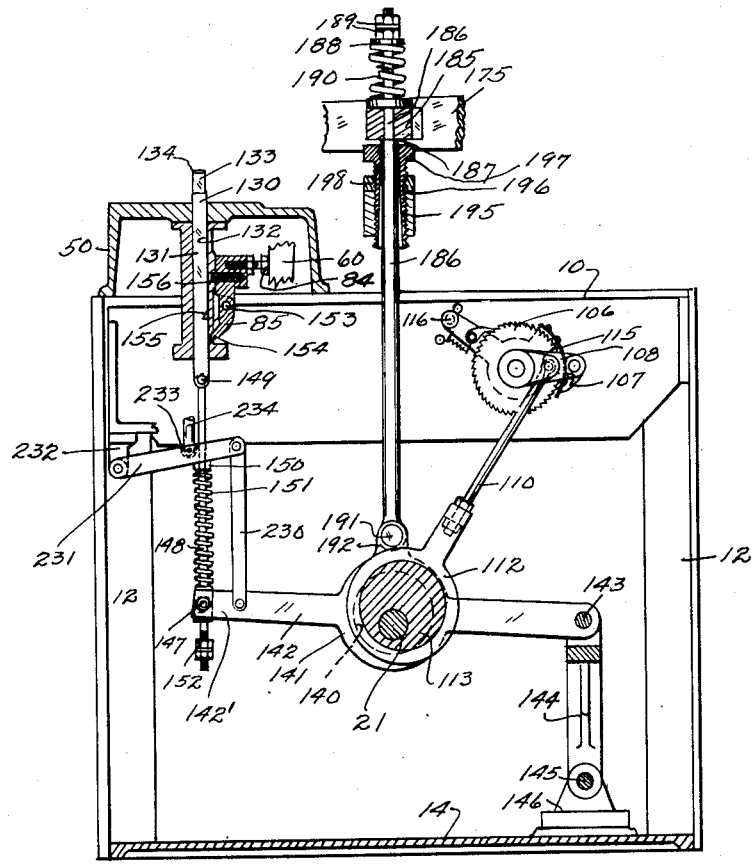
Figure 7:
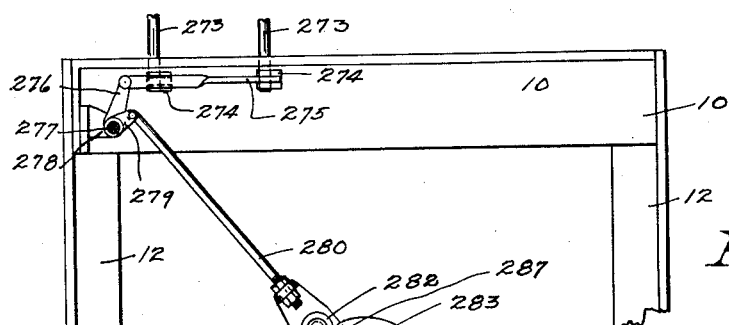
Figure 9:
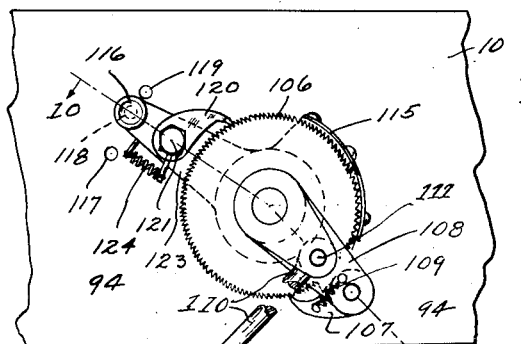
Figure 10:
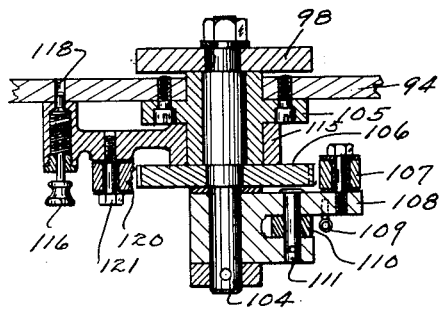
Figure 11:
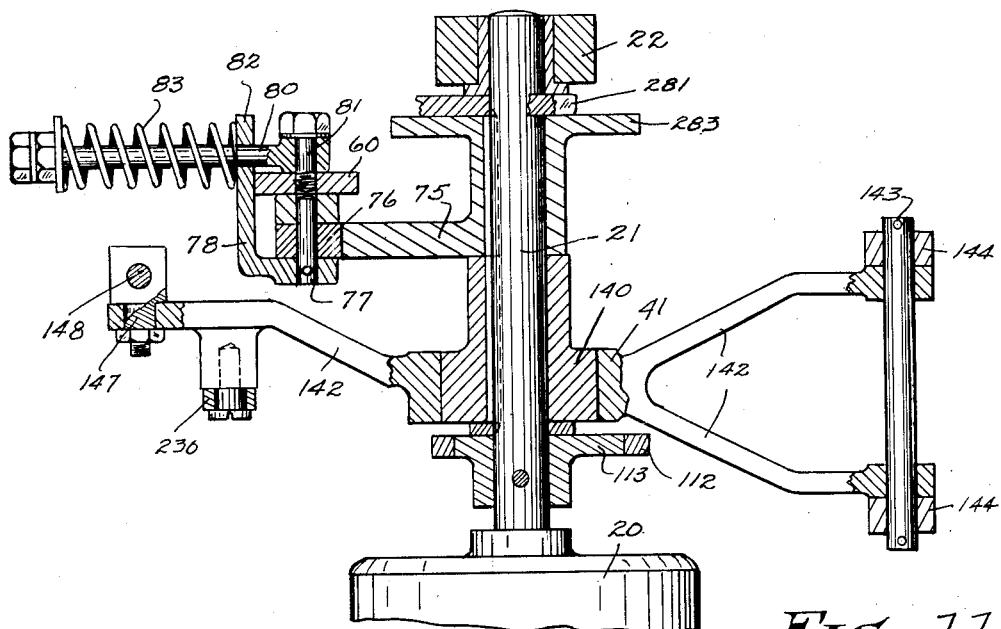
Figure 24:
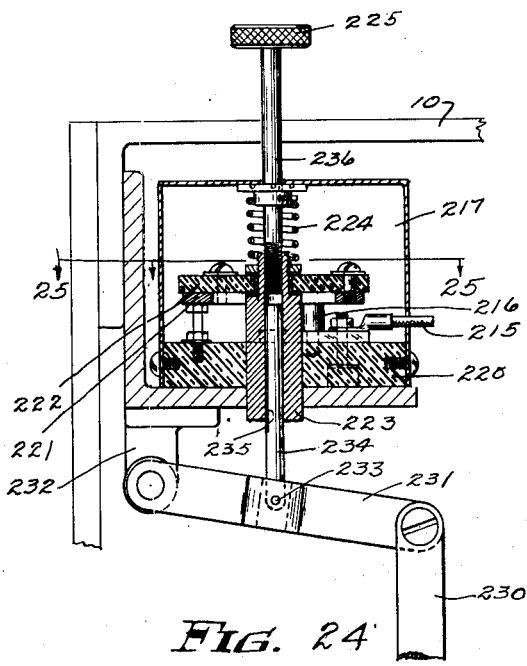
Figure 25:
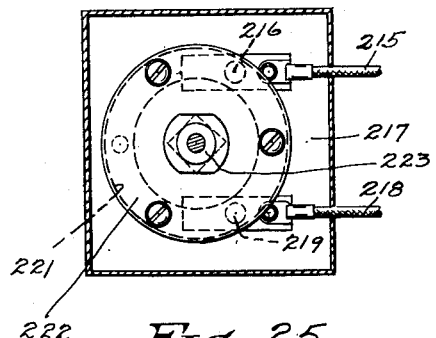
Figure 19:
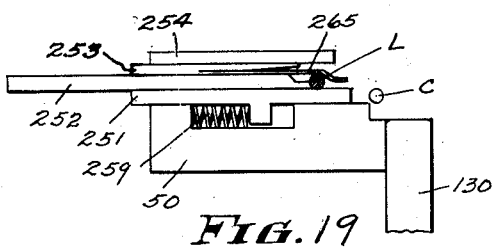
Figure 42:
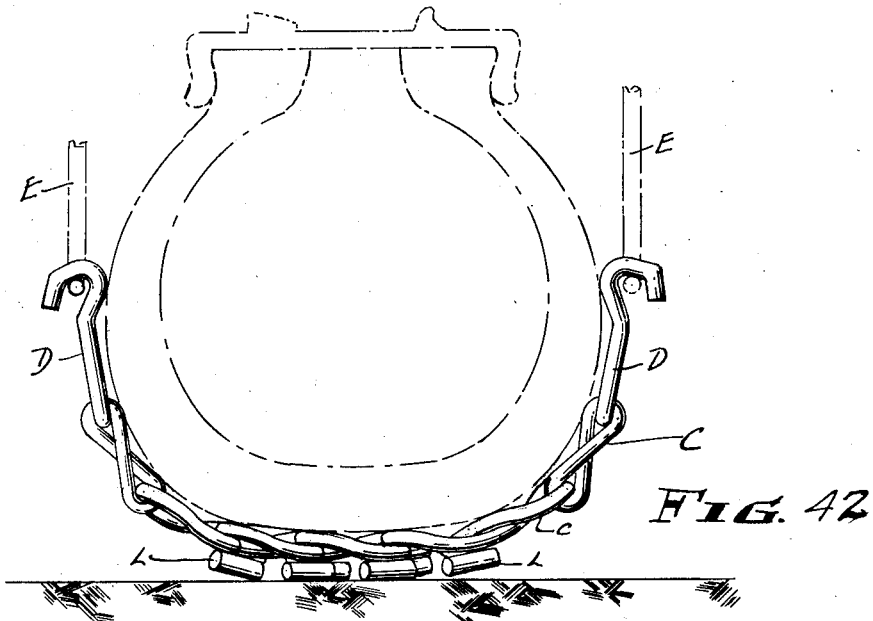
Figure 43:
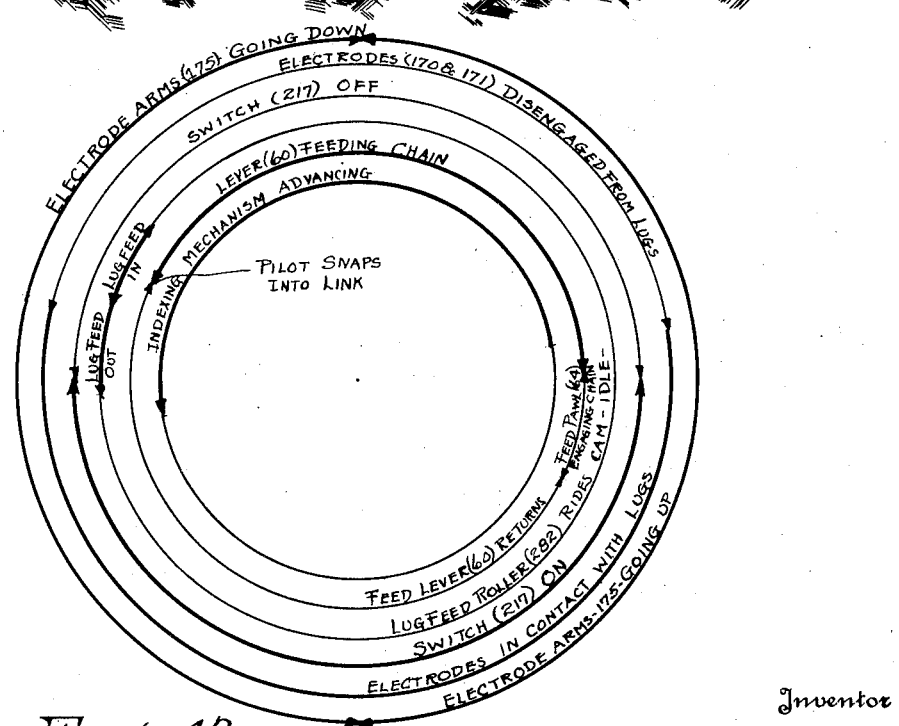

Referring to the drawings, Fig. 1 is a side elevation of a complete machine; Fig. 2 is a plan of the machine with certain of the parts, such as the transformer, the electrode and its carrier, and the lug-feeding apparatus broken away; Fig. 3 is a vertical section of the machine, some of the parts being broken away, and is taken substantially along the lines 3—3 on Fig. 2; Figs. 4 and 5 are fragmentary sections taken in substantially the same plane as Fig. 3, but illustrating some of the parts in different positions; Figs. 6 and 7 are vertical sections and are taken substantially along the lines 6—6 and 7—6 respectively on Fig. 2; Fig. 8 is an enlarged detail and is indicated by the lines 8—8 in Fig. 3; Fig. 9 is an enlarged detail of an indexing mechanism shown in Fig. 6; Fig. 10 is a substantially horizontal section and is indicated by the offset line 10—10 on Fig. 8; Fig. 11 is a detailed section and is indicated by the offset line 11—11 on Fig. 1; Figs. 12 and 13 are enlarged details of the welding table, in which the chain is held during the welding operation; Figs. 14, 15 and 16 are vertical sections and are indicated by the lines 14—14, 15—15 on Fig. 12 and 16—16, on Fig. 13; Figs. 17 and 18 are details of the chain; Figs. 19 to 23 inclusive are diagrammatic illustrations of different stages of progress of the lugs through the lug positioning and welding apparatus; Fig. 24 is a sectional detail of switch mechanism; Fig. 25 is a horizontal construction, and is indicated by the lines 25—25 on Fig. 24; Fig. 26 is a horizontal section illustrating the electrode arm and its mounting and is indicated by the lines 26—26 on Fig. 22; Fig. 27 is a side elevation of the electrode-carrying arm, illustrated in Fig. 26; Fig. 28 is a vertical section as indicated by the lines 28—28 on Fig. 27; Fig. 29 is a vertical section indicated by the line 29—29 on Fig. 28; Fig. 30 is an end elevation of a portion of the hopper and feeding mechanism for the lugs; Fig. 31 is a centrally-located vertical section and is indicated by the lines 31—31 on Fig. 30; Fig. 32 is a sectional detail and is indicated by the lines 32—32 on Fig. 30; Fig. 33 is a section transverse of a spillway in lug-feeding column and is indicated by the lines 33—33 on Fig. 32; Fig. 34 is a plan of chain used in forming the cross-chain; Figs. 35 to 40 inclusive are details of different forms of chains having the lugs welded thereon at various spaced intervals illustrating some of the arrangements this machine is capable of producing; Fig. 41 is a plan of a completed cross-chain; Fig. 42 illustrates the cross chain in use; Fig. 43 is a diagram and illustrates the timing of the various mechanism and movements for one cycle of operation.

In the embodiment shown, there is provided a main frame 10, adapted to support the different units of the welding mechanism, namely, the power unit, the chain feed unit, the lug feed unit, the welding bed, the electrode assembly and the transformer unit. The frame 10 comprises a table-like structure, having a top 11, supported by legs 12, which join the top with a base 14. The structure is provided with suitable cross frame or bracing members, which serve to give it rigidity.

The power unit, which propels the various mechanisms, hereinafter to be described, includes a motor 15, which is adjustably carried on the underside of the top 11. As illustrated in Figs. 1 and 2, the motor is provided with a suitable pulley 16, which, through the medium of a chain or belt 17, drives a pulley 18, mounted on the drive shaft 19 of a gear reduction unit 20. This gear reduction unit 20 is rigidly secured to the base 14 and drives a power shaft 21, Figs. 1 to 7 inclusive, and Fig. 10. The power shaft 21 is mounted in suitable bearings 22 (Fig. 7) which are carried by the base 14. The power shaft carries suitable cams, hereinafter to be described, which propel the various mechanisms of the machine.

The chain C to which the lugs are to be welded is supplied in substantially continuous lengths, and stored in suitable containers or barrels, such as illustrated at 25 in Fig. 1. The chain passes from the container upwardly through a guide loop 26, carried by a bracket 27 adjacent one side of the frame, and passes over a pulley 28 mounted on a shaft 29 carried by the bracket 27. From the pulley, the chain passes over a suitable grooved guideway 30 and is held in contact therewith by a flat spring 31. From the guideway 30 the chain passes across the machine to a welding bed 50, which is mounted on the top of the machine adjacent the left-hand side, as shown in Figs. 1 and 2. This welding bed is provided with suitable guideways and feeding means, hereinafter described, and has a flanged guide member 52, which extends from the bed to the left-hand side of the machine and carries the chain into a position to drop into a suitable can or container 54. The arrangement is such that the stretches of chains C' and C", which overhang the machine on the opposite sides, by reason of gravity will hold the chain taut over the welding bed, which is raised slightly above the top of the frame.

The chain C is fed across the table from right to left (Figs. 1 and 2) by a suitable feeding arm or lever 60 (Figs. 1-5) which feeds a link, or a predetermined number of links, across the welding bed 50 in each cycle of operation of the machine. The feeding arm 60 is pivotally mounted on a cross-shaft 61, carried by a bracket 62 secured to the base 14 of the frame. Adjacent the upper end of the lever 60 is a channel shaped member or shoe 63, arranged to guide the chains on the lever. The shoe 63 is interposed between the pulley 28 and the welding bed 50 and engages the chain at all times. Pivotally mounted on the shoe 63 is a pawl 64, having an upwardly extending tooth 65, which passes through a slot formed in the shoe 63, and which is adapted to enter the links of the chain C.

When the arm 60 is drawn to the rear, the pawl 64 is withdrawn from engagement with the chain by a suitable friction device. Such device is best shown in Figs. 3 and 8, and comprises a shoe 66 carried in a stud 67, pivotally mounted on a rearwardly extending arm 68 of the pawl 63. The shoe 66 is held in engagement with a rod 69 by a suitable compression spring 70 carried in a recess in the stud 67. The rod 69 is pivoted at 71 to a bracket 72 mounted on the table. The pivot 71 is located some distance to the right of the lever 60 (Fig. 3) and is of such a length as to remain engaged by the shoe 66 at the extreme positions of the lever 60. The construction is such that as the lever 60 swings to the right (Fig. 3) the pawl 64 is rocked counter-clockwise, thereby withdrawing the nose 65 from the chain. The pawl is maintained in this position until the lever starts to swing in a reverse or forward direction, (to the left in Fig. 3) at which time the pawl is rocked clockwise, thereby entering a link in the chain and carrying it forward with the lever.

The lever 60 is swung by a cam 75, which is rigidly mounted on the drive shaft 21. As illustrated in Figs. 3, 4 and 5 and 11, the cam 75 coacts with a roller 76 rotatively mounted on a pin 77, carried by a lever 78, which is rockably mounted on the shaft 61. The lever 78 is drivingly connected to the lever 60 by a resilient connection, which as shown in Fig. 11, comprises a rod 80, pivotally mounted on the lever 60 as at 81, and which passes through an ear 82 of the lever 78. A suitable compression spring 83 surrounds the rod 80, and serves to retain the levers 60 and 78 normally in contact with each other.

The resilient driving connection just described permits the forward stroke of the lever 60 to be adjusted. The adjustment is effected by a threaded stud 84 (Figs. 3 and 6) mounted in a latch 85, which is pivoted to the welding bed 50, and which serves a purpose hereinafter to be described. The stud 84 is retained in an adjusted position by a suitable lock nut 86. When the lever 60 reaches the end of its forward stroke (to the left in Fig. 3) it contacts with the stud 84 and causes the latch to strike an abutment 87 on the bed 50 and thereby stop the movement of the lever 60. The stud is so positioned, as to limit the forward movement of the lever 60, in such a manner that the chain C will be carried forward to a predetermined position.

It is desirable that the welding mechanism weld lugs on a selected number of consecutive links, and then skip a selected number of links, and so on. It has been found most expedient to feed the chain a link at a time, until sufficient links have been consecutively fed to care for the predetermined number of lugged links, and then feed, one cycle of operation of feeding mechanism, a plurality of links the last one of which becomes the first of the succeeding group of lugged links.

The feeding operation described allows great speed of the machine, as it permits the welding operation to be carried on during every cycle of operation of the machine, there being no extra cycle to feed the several links which do not require lugs to be welded thereon. This is accomplished by providing a variable rearward limit for the feeding arm 60, as about to be described.

In the construction illustrated, the feeding arm is positively driven in a feeding direction by the cam 75, but is returned by a spring 88, one end of which is secured to the arm 60, and the other end to a frame member, as at 89, and which spring serves to cause the roller 76 to remain in contact with the cam 75. When the links are fed one at a time a pawl 90 pivoted to the lever 60 as at 91 contacts with suitable stop 92 and prevents further rearward movement of the lever. However, when a plurality of links are to be fed, a stop 93 adjustably mounted on a cross frame member 94 contacts with the lever 60 itself and prevents the further rearward movement.

The arrangement of the stop 92 is such that it may be automatically withdrawn when a predetermined number of links have had lugs welded thereon. To this end the stop 92 is pivoted to a stud 92a secured to the frame member 94. The stop 92 has a downwardly extending arm 95, to which is pivoted a link or plunger 96, which is slidably mounted on a bracket member 97, pivotally mounted on the frame member 94. The rearward end of the plunger 96 coacts with a cam disc 98 and is normally held in contact with the periphery of the disc by a spring 102. The periphery of the disc 98 is provided with two notches 100 and 101 and as the disc 94 is rotated, the notches will be presented to the plunger and will permit the spring 102 to carry the plunger rearwardly, thereby swinging the stop 92 about its pivot, permitting the passing of pawl 90 over the stop 92 and into contact with the stop 93.

To permit the pawl 90 to pass idly over the stop 92 on the feeding movement of the arm 60, the pawl is pivoted as at 91 to the lever 60 and held in position against a pin 126 by a suitable spring 127. Hence, the return movement of the lever 60 will cause the pawl to be cammed upwardly by the stop without otherwise affecting the parts.

A suitable indexing mechanism is provided to rotate the disc 98. Referring to Figs. 9 and 10, the disc 98 is rigidly mounted on a stub-shaft 104, carried by a bracket 105, which is secured to the frame member 94. Rigidly secured to the shaft 104 is a ratchet wheel 106, which is adapted to be rotated by a pawl 107, carried by an arm 108 and retained in contact with the ratchet by a spring 109. The arm 108 is pivotally mounted on the shaft 104 and is swung back and forth to feed the ratchet by a lever 110 pivoted to the arm 108, as at 111 (see Figs. 6, 9 and 10). The lever 110 carries, on its lowermost end, a cam ring 112, which embraces a disc-cam 113 rigidly secured to the main drive shaft 21. The construction is such that the ratchet is caused to be moved a number of teeth for each cycle of operation of the machine.

It is desirable that the welding mechanism be so constructed that the number of links fed, one at a time, may be varied. Hence, an adjustment is provided so that the number of ratchet teeth fed by the pawl 107 for each cycle of operation, may be varied, as about to be described.

In the construction shown in the drawings, the ratchet has one hundred and twenty teeth. If three links are to be fed consecutively, it is apparent that, because there are two oppositely disposed notches in the cam disc 98, the ratchet wheel must be given one sixth of a rotation; likewise if there are to be four links fed consecutively, the ratchet must be given one eighth of a rotation, and for five links, one tenth of a rotation, and so on. In the particular construction shown in the drawings, the ratchet wheel 106 has one hundred and twenty teeth. Accordingly, to feed three links, the ratchet must be turned twenty teeth; to feed four links fifteen teeth; for five links, twelve teeth.

To affect the variable feed of the ratchet wheel, I provide a guard 115 which is adjustable about the axis of the ratchet wheel and serves to withdraw the pawl at a variable point on the rear stroke of the pawl. The setting of the guard therefore determines the number of teeth which will be picked up by the pawl and fed by the ratchet.

The guard 115 is shown as rotatably mounted on the shaft 104 and as being adjustably positioned by means of a stop or spring pressed plunger 116, which coacts with recesses 117, 118 and 119, in the frame member 94. The recesses are so spaced as to cause the mechanism to feed 3 links, 4 links or 5 links, as required. The guard 115 overhangs the ratchet wheel 106, as shown in Fig. 9, and is so positioned that the pawl is lifted out of engagement with the ratchet wheel on the stroke, thereby reducing or regulating the number of teeth that will be fed by the forward movement of the pawl. A suitable detent pawl 120, pivotally mounted at 121 to an arm 123 of the guard is pressed against the ratchet by a spring 124 and acts to stop the movement of the ratchet and prevent it from over-throwing, thereby insuring an accurate feed.

The stop 93 is adjustably mounted in a slot 93a in the frame member 94, so that the lever 60 may return a distance equivalent to the number of links desired without lugs, plus one. For example, if it is desired to have lugs on four consecutive links, and then five links without lugs, the stops are set in the position shown in the drawings to feed six links at a time.

In Figs. 3 and 9, the chain C is in position to place a lug on the first link, and the plunger 96 has passed from the notch 100 by an angular distance of 45° or its equivalent, fifteen ratchet teeth. On the first cycle of operation the lugs are welded on the link so positioned and as the lever 60 advances to feed the next link the ratchet 106 is advanced fifteen teeth in which position the plunger 96 is 90° from the notch 100, the guard 115 being in a position with the adjusting pin 116 in the opening 118, as shown in Fig. 9. Then lugs are welded on the second link, and the return or non-feeding movement of the lever 60 is stopped by the member 92, which permits it, on its next forward movement, to feed only one link. Simultaneously with this next feeding movement, the ratchet 106 is advanced an additional fifteen teeth, bringing the notch 100 a total of forty five teeth or 135° from the plunger 96. The lugs are then welded on the third link. The stop 92 again engages the lever 60 and on its next forward movement it feeds one more link and the ratchet 106 is fed an additional fifteen teeth, making a total of sixty teeth or 180°. Lugs are welded on this link, making four consecutive links with lugs welded thereon.

The ratchet has now been advanced sixty teeth and the notch 180°. However, at this period the plunger 96 has entered the recess or notch 101, which is spaced 180° from the notch 100 thereby withdrawing the stop 92 from the path of the pawl 90 and permitting the spring 88 to return the lever 60, beyond the stop 92, into engagement with the stop 93. In the setting shown in the drawings, the stop 93 is positioned so as to permit the lever to pick up six links and feed them across the welding table, bringing the sixth link to a position to have lugs welded thereon. This feeding movement will advance the ratchet fifteen teeth with the notch 101, thereby bringing the stop 92 again into an active position.

It is sometimes desired to vary the length of the links in certain cross chains, as is illustrated by the links L and L' in Figs. 38 and 39. The feeding mechanism is so constructed that it may be adjusted for various lengths of link. To this end the feed stop 93 which is mounted in the slotted opening 93a need only be set at the proper position in the slot. Likewise, the stud 92a is adjustable in a slot 92b in the frame member 94. This slot is so positioned and inclined that the resultant movement of the end of the stop will be substantially horizontal, thereby enabling the feeding device to be adjusted to feed links of various lengths.

Immediately after the chain has been fed to the welding table, it is accurately positioned so that the lugs may be placed thereon in proper relationship with the links. This is accomplished by means of a pilot member 130 which is best illustrated in Figs. 3, 6 and 11 to 14. The pilot 130, comprises a bar 131, slidably mounted in a vertically extending slot 132 in the frame of the welding table 50. The upper portion 133 of the pilot is of such shape as to enter the link in the chain. The upper corners of the pilot thereof are bevelled as at 134, so as to guide the link and position it on the pilot head 133 and thereby accurately align it.

The pilot is operated or reciprocated in an up and down movement by a cam 140, rigidly secured to the main drive shaft 21, and which rotates within a ring portion 141 of a beam 142. The ring 141 is located intermediate the ends of the beam, the rearmost end of which is pivoted as at 143 to a link 144 pivoted at 145 to a bracket 146, secured to the base 14 of the machine. The forward or left hand portion 142' of the beam 142 Figs. 6 and 11, carries a pivot pin 147 through which a link or rod 148 is slidably mounted. The uppermost end of the rod 148 is pivoted as at 149 to the pilot bar 131. Intermediate its end, the rod 148 has a fixed collar 150. Between this collar and the pivot pin is a compression spring 151 which normally acts to retain the bar 131 in an uppermost position. As the arm 142' of the beam is rocked to a lowermost position, the pivot pin coacts with a nut 152 on the rod 148 and positively withdraws the rod downwardly.

The bar 131 (Fig. 6) is normally locked in a downward position by the pawl 85 heretofore mentioned. The pawl 85 is pivoted at 153 to the frame 50 and has a nose 154, which is normally held in engagement with a notch 155 in the plunger by means of a spring 156. At such time as the feed lever 60 nears the ends of its feeding stroke (to the left in Fig. 3), it contacts with the stop pin 84, previously described, and swings the latch into a non-engaging position, thereby permitting the spring 151, which has previously been compressed by the upward movement of the beam 142, to snap the pilot bar 131 upward through the link, with great speed.

The welding table 50 comprises a bed 160 (Figs. 12-16) on which is mounted, by means of suitable bolts, a guide block 161, through which is cut a channel 162. Suitable guide members or fillers 163 are secured to the bottom and side walls of the channels 162 by means of suitable bolts or set screws 164 and serve as guides for the chain. These guide members or fillers are electrically insulated from the guide block 162 by means of suitable insulation 165 and are insulated from each other by an insulation member 166.

After the pilot 130 has positioned a link, suitable lugs indicated at "L" in Fig. 12, are fed by suitable means, hereinafter described, which superimposes the lugs upon opposite or diagonal corners of the links, as illustrated in Fig. 12. Suitable electrodes of respectively opposite polarity are then brought into contact with the lugs and a welding current applied thereby simultaneously welding both lugs to the link, the link itself carrying the current from one lug to the other. The electrodes may comprise a pair of bars of copper or a similar substance which is capable of conducting an electrical welding current with a minimum loss of voltage and amperage. They are arranged immediately above the lugs, which have been positioned on the links and at the proper time are moved into engagement therewith as hereinafter explained.

In the embodiment shown (Figs. 1, 25, 26 and 27) the two electrodes 170 and 171 are each adjustably mounted in substantially vertical slots 172 in electrode carriers 173, which are made of a material suitable for conducting the welding current to the electrodes. The electrode carriers are separated from each other by an insulating washer 174, which may be of mica or other high grade insulation. The carriers are mounted between a pair of arms 175 by means of suitable bolts 176, which are insulated from the electrodes and from the carriers by insulating sleeves 177. Interposed between each electrode carrier and the adjacent arm 175 is an insulating plate 178. Thus, it will be seen that each electrode is insulated from the other as well as from the various supporting mechanisms.

In the embodiment shown, the lugs L are short cylindrical pieces positioned at diagonally opposite corners of the links, and at an angle of substantially 27° from the axis of the chain. Hence, it has been found advantageous to mount the electrode carrying arms at an angle of 27° from the path of movement of the chain, as illustrated in Fig. 2. The electrodes are mounted on the forward or left-hand end of the arms 175 (Figs. 1 and 26), the rearmost ends of which are pivotally mounted on a pin 180, carried in an upstanding column or bracket 181, rigidly fixed to the frame 14 by suitable bolts 182. A sleeve 183 surrounding the pin 180 between the arms serves to space the latter and retain them in a parallel relation.

The arms are reciprocated or swung vertically in a manner which will raise the electrodes clear of the lugs, and thereafter bring them down into contact with the lugs, and then increase the pressure on the lugs as the welding current heats and softens the work, thereby insuring a most advantageous welding of the lugs to the links.

Pivotally mounted intermediate the ends of the arms 175 is a block 185, through which a bar or rod 186 passes, Fig. 6. The bar or rod 186 has a shoulder 187, which normally abuts the lower or bottom face of the block, and extends some distance above the block. The uppermost end of the rod is provided with a washer 188 and adjusting nut 189, while disposed between the washer and the block, is a suitable compression spring 190 surrounding the rod and normally serving to retain the shoulder 187 of the rod in position against the block 185.

When the welding electrodes are moved upwardly, the shoulder 187 is forced against the block 185 and positively swings the arms 174 upward, thus carrying the electrodes a short distance above the chain, to a position where the chain may be fed or advanced without interference with the electrodes. When, however, the rod is pulled downward to bring the electrodes into contact with the lugs, the arm 175 is moved downward until the electrodes abut the work, and then as the heating current is applied to the electrodes, further downward movement of the rod causes a compression of the spring 190, thereby increasing the pressure of the electrodes on the lugs and forming the welds under compression.

The electrodes are operated from the main drive shaft 21. As shown in Fig. 6, the rod 186 is pivotally connected as at 191 to an ear 192 on the ring 141 of the beam 142, which is swung or oscillated by the cam 140 on the main drive shaft, as heretofore described. A suitable stop is provided to prevent excess pressure of the electrodes on the lugs and links and thereby prevent undue distortion of the links. In the drawings, this stop comprises a frame member 195, mounted on the top of the frame 10 and through which the rod 186 passes. The member 195 is internally threaded and is provided with a sleeve 196, having a head 197, which may be adjusted up and down and locked in an adjusted position by a suitable lock nut 198. The inner diameter of the sleeve is somewhat greater than the outer diameter of the rod 186, to the end that the sleeve will not interfere with the swinging movement of the rod 186.

The stop sleeve 196 is adjusted so that the head 197 contacts with the lower surface of the block 185, when the electrodes have reached the lowermost position consistent with a good weld combined with a minimum amount of distortion of parts. Thereafter the continued downward movement of the rod serves only to compress the spring 190 and has no further effect on the arms 175 or the parts being welded.

The angular movement due to the swinging of the electrode carrier in a plane which is 27° from the path of the chain and the axis of the pivot 191 of the rod 186, is very slight. Hence, because of the comparatively great length of the rod 186, a small amount of loose play in the pivot 191 readily cares for this movement without effecting the operation of the parts.

The electrode carriers 172 are preferably hollow and are provided with suitable connections for a cooling liquid, such as water. In the drawings, the electrode carriers 172 comprise hollow castings, each of which has an inlet port 200 and an outlet port 201. A flexible member, such as flexible tubing 203 (Figs. 1, 26, 27 and 28) connects the inlet port 200 of one of the electrode carriers 172 to a suitable source of supply, such as a water line 204, which may lead from a suitable pump (not shown). The outlet port 201 of this electrode carrier is connected to the inlet port 200 of the other electrode carrier 172 by a suitable tube 205. The outlet port 201 of the last mentioned electrode carrier is connected by a flexible tube 206 to a conduit 207, which leads to a suitable drain (not shown).

A suitable source of welding current is supplied. When alternating current is used a suitable low-voltage output transformer is provided, such as is generally indicated by dotted lines 210 on Fig. 1. The transformer may be supported in any manner convenient. It is desirable to keep the leads from the transformer to the electrodes as short as possible, and thereby prevent line losses. Hence, the transformer 210 is preferably supported on the frame 10 by suitable upstanding legs 211, flexible leads being supplied to connect the output coils of the transformer with the electrodes. In the drawings, these leads are shown at 212, and comprise suitable laminated metal strips, preferably copper. There are two such leads shown, one for each output pole of the transformer, each lead being joined by suitable bolts to the corresponding electrode carrier.

To minimize the cost of electric current, it is desirable that the welding current be supplied to the transformer only during the welding operation. To this end, one side of the input line leading to the primary winding of the transformer 210 is connected by a line 215, with one contact 216 of a switch 217 (Figs. 24 and 25), and a connection 218 leads from the other contact 219 of the switch to the source of current.

The switch 217 may be of any suitable construction, which will prevent excessive arcing. Referring to the drawings, and especially to Figs. 24 and 25, the switch 217 comprises a mounting base 220, which is composed of a suitable insulating material, and to which the terminals or contacts 216 and 219 are secured. The contacts may be bridged by a metallic ring or plate 221, carried by an insulating disc 222, which is rigidly mounted on a post 223, the post being slidably mounted in the base 220. When the switch is closed the bridge plate is retained against the contacts by a suitable compression spring 224. The post 223 is provided with a knob 225, which extends upward above the top of the frame, to provide an adjustment for the timing of the switch, as will hereinafter be more fully described.

The switch 217 is operated from the main drive shaft 21. As shown in Figs. 6 and 24, a link 230 connects the beam 142, heretofore described, with a lever 231 pivoted to a frame member 232. The lever 231 is connected by a suitable connection 233 with a plunger 234, which is slidably mounted in a recess 235 in the post 223. When the plunger is raised, it first slides upwardly in the recess 235 in the post, but before the electrodes are disengaged from the work, the plunger strikes the threaded extension 236 of the knob 225 and raises the plate 221 from the switch contacts, thereby opening the primary current to the transformer. On the next cycle of operation, the plunger is carried down. When the electrodes reach the work, the bridge reaches the contacts and establishes an electric circuit to the transformer. Further downward movement of the plunger retracts the latter within the post without affecting the switch parts. The timing of the switch may be adjusted by turning of the knob, thereby changing the time of contact between the plunger and the threaded extension 236 of the knob.

The lugs L are fed to the welding table through a pair of tubes 239 from a suitable feed hopper 240 (Fig. 1) hereinafter to be more fully described. The welding table is provided with a pair of channels 250, Figs. 12 to 15 inclusive, which channels extend at an angle of 27° from the path of the chain and normal to the axis of the lugs. The channels 250 are disposed on opposite sides of the chain and are offset relative to each other so that the lugs may align with the diagonal corners of the links, as shown in Fig. 12.

Slidably mounted in each channel 250 is a channel shaped bar 251, each of which carries a flat plunger bar 252, and each of which is covered by a suitable cover plate 253, secured to the channel bar 251 by suitable bolts, not shown. A cover plate 254 is superimposed on the table over each of the grooves 250. These cover plates are held in position by cam members 255, pivoted at 256 and which act to retain the channel bars and plungers within their respective grooves 250, the plungers and channel bars being reciprocated in their grooves by suitable mechanism hereinafter described.

When the chain is being fed across the table 50, the plungers are drawn away from the chain, and one end of a recess 257 in each of the plungers engages a pin 258 mounted in the corresponding channel bar and retains the bar in a withdrawn position. When the chain comes to rest and the pilot 130 enters the links, the plungers 252 are brought towards the links, and a spring 259 mounted in a recess 260 coacts with pins 261 which are integral with the channel bars, and urges the channel bars against the links, thereby positioning the links against the pilot.

The lugs L are fed from the tubes 239 to the channel bars through a slotted opening 264 in the sides of the bars. As the lugs are fed into position on the channel bars, they underlie flat springs 265 carried by the caps 253 and which serve to keep the lugs in contact with the channel bars and retard their movement, thereby preventing inadvertent displacement due to the speed of the mechanism. In this position, the bottom face of each lug is in a plane slightly above the top face of the link, and as the plunger bar is still towards the link, it pushes the lugs from beneath the springs onto the link, where the lugs are immediately gripped by the electrodes.

Figure 20:
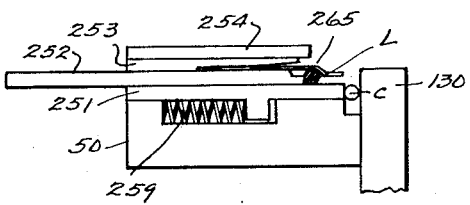
Figure 21:
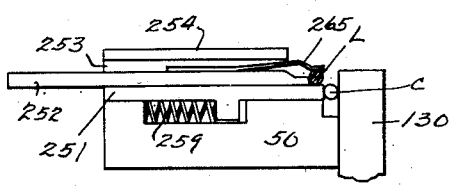
Figure 22:
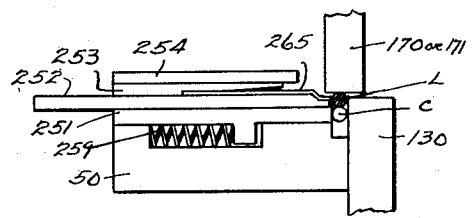

The operation of the lug feed will be best understood from the diagrammatic illustrations shown in Figs. 19 to 23 inclusive. First the chain is fed across the table, to position a link, to which lugs are to be welded, while the channel bars 251 and plungers 252 are in their retracted positions. Simultaneously lugs are fed by gravity into each of the channel bars 251, immediately in front of the plungers 252 and beneath the springs 265 shown in Fig. 19. Next the pilot 130 enters the link c and the plunger is slid forward an amount sufficient to cause the channel bars 251 to position the links against the pilot, as illustrated in Fig. 20. The continued movement of the plungers 252 carries the lugs along the channel bars 251, as shown in Fig. 21, and from under the spring 265 onto the link C and thereafter the electrodes 170 and 171 grip the lugs as shown in Fig. 22, and retain them in place on the link.

Figure 23:
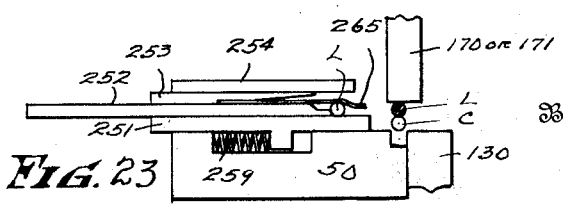

When in its extreme uppermost position the top surface of the pilot is a short distance below the top of the lugs, thereby preventing contact between the pilot and the electrodes. As shown in Fig. 23, the pilot and plunger are then withdrawn and the welding operation takes place. Thereafter two more lugs are fed to the channel bars and the chain is advanced, bringing another link into position to be engaged by the pilot and the cycle of operation begins anew.

The lug feed, namely the plungers 252 and their associated parts, is operated from the main driving shaft 21. Each plunger 252 has, as shown in Figs. 2, 7, 12 and 13, a hook portion 270, which projects from the outer ends of the respective channels 162. The hooks 270 embrace the rounded ends 271 of arms 272, which are rigidly secured to shafts 273. The shafts 273 extend vertically through the welding bed 50. Rigidly secured to the shafts 273, below the welding bed, are suitable horizontally extending arms 274, which are connected by links 275, to levers 276. The levers 276 are rigidly secured to a common rock shaft 277 which is mounted in suitable bearing brackets 278 secured to the main frame 10, as is best illustrated in Figs. 2 and 7.

The rock shaft 277 is operated by a cam mechanism, which is associated with the main drive shaft 21. Rigidly secured to the rock shaft 277 is a lever 279 (Fig. 7) which is pivotally connected to one end of a bar 280, the other end of which is forked as at 281, and slidably embraces the shaft 21. The forked end 281 of the bar 280 carries a roller 282 which is held in engagement with a cam 283 by a suitable tension spring 284, one end of which is secured to the bar 281, as at 285, the other end of which is secured to a suitable frame member, as at 286. As the cam 283 is rigidly mounted on the shaft 21, it will be seen that the roller 282 will drop into a recess 287, once for each cycle of operation of the machine, namely, once for each revolution of the shaft 21, thereby causing the lugs to be fed by the plungers 252 to the chain links, as heretofore described.

This hopper portion 240 is approximately semi-circular in cross-section at the discharge end, is open at the top and extends toward the left, in Figs. 1 and 30 away from the disc 292. In the preferred form of this storage member 240 of the hopper, the curved lower portion 294 has a bottom wall 295, which is substantially flat and slopes downward towards the bottom of the disc 292. The angle of slope of the bottom being greater than the angle of repose of the lugs. The result of this arrangement is such that the lugs within the hopper are fed by gravity towards the lower extremity of the disc.

For driving the selecting disc 292, the shaft 291 carries a spiral gear 300, which meshes with a spiral gear 301 mounted on a shaft 303, carried by the bracket 290. The shaft 303 in turn carries a pulley 304, (Fig. 1), which is drivingly connected by means of a belt 305, with a pulley 306 mounted on the main drive shaft 21. The selecting disc is rotatively mounted on the shaft 291, and may be driven thereby through the intermediacy of a pair of spring pressed plungers 308, mounted in the hub of the selecting disc, and which coact with notches 309 in the shaft 291. The result of this drive is such that, in the event of the jamming of the lugs in the disc, the plungers will ride out of the notches and permit the shaft 291 to rotate independently of the disc, whereby damage to the parts is prevented.

The disc 292 has a channel shaped flange 310, which carries a plurality of lifting members, one of which is shown at 311 in Fig. 30. As the disc is rotated, the lifting members 311 pick up the lugs from the hopper and carry them to the upper portion of the disc, dropping them upon a sloping, flared, chute 312, which is connected with the tubes 239. As the lugs are dropped in the chute 312, they will normally slide from the chute into the tubes, which are rigidly secured to, and serve as a continuation of the chute. However, if a lug turns while dropping or traversing the chute, a lateral spillway 313 (Figs. 32 and 33) in the chute will discharge such lugs before they reach the tubes.

The chute 312 is slidably mounted on a guideway 314, and is retained in place thereon by a suitable spring 315. A lever 316 rigidly secured to the upper end of the chute, carries a pin 317, which coacts with a vibrator ratchet 318, rigidly secured to the hub 319 of the disc, and serves to keep the lugs constantly in motion throughout the length of the chute and tubes. The tubes are slidably mounted in the welding table 50 and are somewhat flexible. Hence, the vibration of the chute is imported to the tubes and facilitates the movement of the lug throughout the length thereof.

The capacity of the feeding device is such that it will over-supply the machine and when the tubes and chute are filled with lugs to the spillway, the surplus lugs dropped thereon by the disc will simply return through the spillway to the hopper.

I will now summarize the mutual timing of the various mechanisms involving the machine, reference being had to the views showing the parts, and also to the timing diagram of Fig. 43, in which the heavy lines indicate active condition of the mechanisms named thereon, and the light lines idle conditions thereof. A complete rotation of a radial line about the center of the diagram indicates one cycle of operation of the machine, and, at any given portion of such cycle, the condition is indicated by the respective heavy or light lines crossing the radius in that position.

I will assume that the parts are in the following position: The feed lever 60 is in its rearmost position and is ready to start forward, and starting the feed to engage the chain for a new purchase thereon; the lug feeding mechanism is idle, the electric current control or switch 217 is in an "on" position, and the electrodes 170 and 171 are leaving contact with the lugs while the electrode carrying arms 175 are being raised free from the link which has previously been welded. The operation from this position is as follows:

The switch contacts are separated, thereby cutting the current from the electrodes 170 and 171, and the electrodes then are carried upward, clearing the lugs. The electrode carrying arms 175 reach their uppermost position and start down, while the chain feeding arm 60 functions to initiate the feeding of the chain. The lug feed next comes into operation to initiate the feeding movement of lugs from the channels to their position on the chain. While the lug is being fed, the chain feed stops, and the pilot 130 snaps into place to position the chain. The channel members 251 also snap into position to retain the links against the pilot. The lug feed continues in its movement until the lugs are placed on the previously positioned link of the chain. The electrodes then are brought into contact with the lugs and the lug feeding mechanism begins to withdraw to clear the electrodes. While the lug feed continues to withdraw, the heating switch 217 is then turned on. The electrode arms 175 are then coming down and pressure is applied through the spring 190 to the lugs, thereby welding the lugs to the links. The chain feed lever 60 during this time, has started in its return movement to again pick up another link. This cycle of operation is then complete, and the next feeding movement of the chain begins another cycle.

It will be understood from the description I have given of the embodiment shown in the drawings, that I have provided means for rapidly applying lugs to selected groups of links on a continuous chain, so that thereafter by simply separating the chain into sections at intermediate plain links and mounting attaching hooks in the extreme plain links, I may produce the cross chain as indicated in Figs. 41 and 42. The number of lugged links and the number of plain links may be readily varied, as desired; thus Fig. 35 indicates alternate groups of three lugged links and three plain links made from the blank chain of Fig. 34; Fig. 36 indicates groups of four lugged links and three plain links; Fig. 37 three lugged links and five plain links; Fig. 38 seven lugged links and five plain links. By taking the different chains produced as indicated in Figs. 35 to 38 for instance, and severing through plain links, one can obtain a different number of links in the lugged group and also a different number of links in the plain group at the opposite end of the lugged group. Ordinarily it is preferable to provide an odd number of links in the plain group and to sever the mid-link of such group, so as to leave the same number of plain links on each end of the short section produced.

The complete chain of Fig. 41 has presumedly been made from the chain of Fig. 37 having three lugged links in the lugged group and five plain links. In this case, the mid-link in the plain group was severed, thus producing a cross chain having three lugged links intermediately and two terminal plain links at each end, the extreme plain link receiving the fastening hooks D which are designed to engage the circumferential chains indicated at E in Fig. 42.

It will be seen also that my mechanism is adapted for operating on links of various lengths, as for instance, the long links illustrated in Fig. 39, or the short links of Fig. 40.

By welding the lugs to the opposite shoulders of the links, I provide very effective cleats to prevent skidding or slipping, as illustrated in Fig. 42. At the same time, I do not interfere at all with the twisting of the chain to allow it to lie snugly about the tire casing, and thus there is no undue wear on the tire casing by reason of the lugged characteristics of this chain.

It will be observed also that my method of welding two lugs to a link simultaneously, with positive and negative electrodes, engaging the lugs and the link carrying the current between them, produces a uniform welding action on the two lugs, as well as allowing great speed of operation. Moreover, by reason of the constantly acting spring pressure during the welding operation, I obtain a very effective weld.

Finally, it will be remembered that in my machine, irrespective of the number of plain links, I am able to feed the entire group thereof together with a link to form the first of the next welded group in a single cycle of the mechanism, so that the machine goes on in repeating cycles one for every welded link and without loss of time for feeding the various plain links. The operation is thus rapid and effective.

It may be noted that a method of making tire chains, which may employ the mechanism forming the subject-matter of this application, is set out and claimed in my divisional application Serial No. 560,970, filed September 3rd, 1931.

I claim :—

1. In a welding machine, a guideway through which the work is progressed, means to position the work in the guideway, means disposed on opposite sides of the guideway adapted to simultaneously bring metallic parts into contact with the work, and a welding unit adapted to weld the parts to the work.

2. In a machine adapted to weld metallic parts to the links of a chain, a guideway through which the chain is progressed, means including a plurality of independently movable slides adapted to position metallic parts in contact with the links and means acting thereafter to simultaneously weld the metallic parts to the chain.

3. In a welding machine, the combination with a frame, of a guideway through which the work is progressed, insulating means interposed between the guideway and the frame, channels in the frame and associated with the guideway, each of said channels having a slide movably mounted therein, means adapted to feed metallic parts to said slides, bars carried by said slides, means to cause relative movement between said bars and their respective slides wherein said means first causes the slide to contact with the work and thereafter acts to cause the bar to feed a metallic part from the slide to a predetermined position relative to the work.

4. In a welding machine, the combination of a guideway for work, of means to position the work in the guideway and independent means including a plurality of independently movable slides adapted to simultaneously superimpose a plurality of metallic parts on the work.

5. In a welding machine adapted to weld metallic parts to a chain, the combination with a welding unit, of means to feed the chain to a predetermined position relative to the welding unit, and means arranged to control the operation of said feeding means to feed a link at a time for a predetermined number of successive operations and then feed a predetermined number of links at one operation of the feeding means.

6. In a machine of the character described, a welding unit, means adapted to progress a chain to the welding unit, said means including a feed arm, means adapted to limit the movement of the arm to cause it to feed the chain a link at a time and an indexing mechanism adapted to withdraw the limiting means.

7. In a welding machine adapted to weld lugs to a chain, feeding means for the chain including a feeding arm, means adapted to limit the movement of the arm to cause it to feed the chain a link at a time, said means being adjustable to compensate for various length of links.

8. In a machine adapted to perform work on a chain, the combination of a work table, means adapted to feed the chain to the work table, said feeding means including a feeding arm, a stop associated with the arm adapted to limit its movement to cause the chain to be fed a link at a time, an indexing mechanism associated with the stop, said indexing mechanism adapted to withdraw the stop after a predetermined number of links have been fed.

9. In a machine adapted to perform work on a chain, the combination of a work table, means adapted to feed the chain to the working position, said feeding means including a feeding arm, a stop associated with the arm adapted to limit its movement to cause the chain to be fed a link at a time, an indexing mechanism associated with the stop, said indexing mechanism adapted to withdraw the stop after a predetermined number of links have been fed, a second stop adapted to act on the feeding mechanism to cause it to feed a plurality of links at one operation.

10. In a welding machine adapted to weld metallic parts to the links of a chain, a feeding means for the chain, said means including a feeding member, a plurality of stops adapted to limit the movement of the feeding member and thereby fix the number of links of chain to be fed for each operation of the feeding means, periodically acting means arranged to act on one of the stops to determine which stop will become operative on the feeding means.

11. In a welding machine adapted to weld metallic parts to the links of a chain, a feeding means for the chain, said means including a feeding member, a plurality of stops adapted to limit the movement of the feeding member, automatic means acting periodically on one of the stops to determine which stop will become operative on the feeding means, and means whereby the interval of the periods may be varied.

12. In a welding machine, a welding unit, means adapted to feed a chain to said unit, means associated with the feeding means to cause it to feed the chain a link at a time whereby the welding unit may operate on successive links of the chain, and periodically acting means adapted to cause the feeding means to feed a plurality of links in one cycle of operation of the welding mechanism wherein the number of links fed may be varied as desired.

13. In a welding machine, a frame, a guideway for work mounted on the frame, an arm movably mounted above the frame, an electrode carried by the arm and disposed above said guideway, an operating member acting on the arm to bring the electrode into contact with the work in the guideway, a resilient connection interposed between the operating means and the arm, whereby the pressure of the electrode on the work is gradually increased.

14. In a welding machine, a frame, a guideway for work carried by the frame, an arm movably mounted above the frame, an electrode carried by the arm and disposed in said guideway, an operating member acting on the arm to bring the electrode into contact with the work disposed in said guideway, a resilient connection interposed between the operating means and the arm, whereby the pressure of the electrode on the work is gradually increased and a stop adapted to limit the movement of the electrodes.

15. In a welding machine, a frame, including a welding table, an arm movably mounted above the table and adapted to carry a plurality of electrodes, each of said electrodes being mounted in an independent carrier, and wherein each of said carriers is insulated from the others and the arm.

16. A welding machine adapted to weld metallic parts to the links of a chain, a guideway for the chain, means to feed a chain to the guideway, means to feed parts to the guideway, the axes of the parts and axis of the chain being in different planes, an arm movably mounted above the guideway, electrodes carried by the arm and wherein the arm moves in a plane parallel with a vertical plane passing through the axis of a metallic part.

17. In a welding machine adapted to weld metallic parts to the links of a substantially continuous chain, a frame, a guideway mounted on the frame, feeding means adapted to feed the chain to the guideway, an arm mounted above the guideway, an electrode mounted in the arm and disposed above the guideway, a channel adjacent the guideway, a slide mounted in the channel adapted to feed a part to a position on the chain, and operating means acting on the slide to cause it to position a part, and thereafter cause the electrode to contact with the part before the slide withdraws.

18. In a welding machine, the combination of a guideway, means to feed links of a chain to the guideway, slides associated with opposite sides of the guideway in offset relationship, said slides being adapted to position lugs on diagonal corners of the links, an arm pivotally mounted above the guideway, electrodes mounted in the arm adapted to contact with the work and cause the weld to be effected between the lugs and the links.

19. In a welding machine adapted to weld lugs to the links of a chain, a welding bed, means adapted to periodically progress the links across the welding bed, a plunger mounted in the welding bed, and means operative on the plunger to cause it to enter the opening in a link thereby positioning it relative to the guideway.

20. In a welding machine adapted to weld lugs to a chain, a guideway for the chain, feeding means adapted to progress the chain through the guideway, a plunger reciprocally mounted in the guideway, said plunger normally being withdrawn from the guideway, a latch to retain the plunger in its withdrawn position, and resilient means adapted to cause the plunger to enter the opening in a link, wherein the feeding means acts to release the latch and cause the plunger to enter the opening in the link and thereby position it in the guideway.

21. In a welding machine for welding lugs to the link of a chain, a frame including a welding bed, feeding means adapted to progress the chain across the bed, a plunger mounted in the bed adapted to enter the opening in a link of the chain and thereby position it, said plunger adapted to extend beyond the link, said means including a slide adapted to force the lug against the plunger, whereby the lug is gripped between the plungers and the slide, an electrode mounted above the bed, and means to bring the electrode into contact with the gripped lug.

22. In a welding machine for welding lugs to a chain, the combination with a welding bed, of an arm adapted to feed links of a chain to the bed, a plunger mounted in the bed, resilient means acting to force the plunger into the opening in a link of the chain, a latch adapted to retain the plunger in a withdrawn position, means carried by the movable member of the latch adapted to coact with the feeding arm to limit its feeding movement and simultaneously release the latch.

23. In a welding machine adapted to weld lugs to the links of a chain, a welding table, means adapted to feed the chain to the table, means to feed a pair of lugs to a link, welding electrodes adapted to contact with the lugs and an electric switch associated with the electrodes adapted to energize the electrodes after the lug feeding means has returned to an idle position and de-energize the electrodes before the chain feed commences its active stroke.

24. In a welding machine, a welding bed, means to feed a chain to the welding bed, an electrode movably mounted above the bed, a positioning device adapted to position the links of the chain on the welding bed, means to position lugs on the links of the chain, an electric switch adapted to energize and de-energize the electrodes, a cam shaft mounted in the frame, cam mechanism on said shaft, and means operatively connecting the cam mechanism to the various mechanisms to cause them to act in a predetermined timed relationship.

25. In a welding machine adapted to weld lugs to the links of a chain, a welding bed, means to feed a chain across the bed, feeding means adapted to feed lugs to be welded to the chain, a hopper associated with the machine adapted to supply the lug feed with lugs, a conduit between the hopper and the lug feeding means, said conduit having a sliding connection with the hopper and the lug feed, means to vibrate the conduit and thereby prevent jamming of the lugs.

26. In a machine of the character described, the combination with a frame, a guideway in said frame, feeding means adapted to feed chain to the guideway, positioning means to position a link of the fed chain, means to feed lugs to opposite corners of the positioned links, electrodes movably mounted above the guideway and adapted to weld the lugs to the link, a source of power for said electrodes, a switch interposed between the source of power and the electrodes, and means connected to and acting in timed relationship with the electrodes and operative upon said switch to cause a welding current to pass through the electrodes only when they are in contact with the lugs.

27. In a machine for welding parts to the links of a preexisting chain, the combination of means for progressing the chain, means for positioning the part to be welded thereto on top of an individual link of the chain, and means for welding such positioned part and link together.

28. The combination with means for progressing a continuous chain a link at a time, means for positioning a lug on one of the links, and means for welding it thereto.

29. In a machine for welding parts to the links of a chain, the combination of means for progressing the chain, means for engaging a link to hold it stationary, means for thereafter positioning a metallic part on such stationary link, and means for welding the positioned part to said link.

30. In a machine for welding lugs on the links of preexisting chains, the combination of means for periodically progressing the chain, means for engaging links successively to hold them stationary against movement in any direction, means for thereafter positioning a lug on a stationary link, and means for electrically welding the lug thereto while the link is stationary.

31. In a machine adapted to weld parts to the links of a chain, the combination of means for progressing a metallic chain, means for positioning two independent metallic parts on opposite portions of one link of the chain, and means for welding the positioned parts to said link.

32. In a machine adapted to weld metallic parts to the links of a chain, the combination of a guideway through which the chain is progressed, means adapted to position simultaneously a plurality of independent metallic parts of a link of a chain, and means acting thereafter to weld such parts to the link.

33. In a machine for welding parts to the links of a preexisting chain, the combination of means for progressing the chain, means for positioning two parts to be welded thereto on one link of the chain, and means for simultaneously welding both of such positioned parts to the link.

34. In a machine for welding parts to the links of a chain, the combination of means for progressing the chain, means for engaging a link to hold it stationary, means for positioning a plurality of parts on such stationary link, and means for simultaneously welding the positioned parts to said link.

35. In a machine adapted to weld metallic parts to the links of a chain, the combination of a guideway through which the chain is progressed, means adapted to position a plurality of independent metallic parts on the link of a chain, and means acting thereafter to simultaneously weld such parts to the link.

36. The combination with means for progressing a continuous chain a link at a time, means for positioning a lug on one of the links, means for welding it thereto, such three operations being automatically repeated on a plurality of links, and means for feeding a plurality of links without the application of lugs.

37. In a machine for welding lugs on the links of preexisting chains, the combination of means for progressing the chain a link at a time, means for engaging links successively to hold them stationary, means for positioning two lugs on such stationary link, means for simultaneously welding the two lugs thereto, said operations of progressing, positioning and welding being performed in this order on several links, and means for then progressing the chain several links at a time.

38. In a welding machine adapted to weld metallic parts to a chain, the combination of a welding mechanism and a feeding mechanism, and means arranged to control the operation of said mechanisms to weld a metallic part to one link at a time for a predetermined number of successive operations and then omitting the welding of parts on a plurality of links at one cycle of operation of the machine.

39. In a welding machine adapted to weld metallic parts to the links of a chain, the combination of a welding mechanism and a feeding mechanism, and means arranged to control the operation of said mechanisms to weld a metallic part to one link at a time for a predetermined number of successive cycles of operation of the machine and then weld a metallic part to the endmost link of a predetermined number of successive links at one cycle of operation of the machine.

In testimony whereof, I hereunto affix my signature.

MERRITT R. WELLS.